United States Patent
Adachi et al.

(10) Patent No.: US 12,240,962 B2
(45) Date of Patent: Mar. 4, 2025

(54) HYDROGENATED CONJUGATED DIENE POLYMER, POLYMER COMPOSITION, CROSSLINKED BODY AND TIRE

(71) Applicant: ENEOS MATERIALS CORPORATION, Tokyo (JP)

(72) Inventors: Takumi Adachi, Minato-ku (JP); Hirofumi Senga, Minato-ku (JP); Michitaka Kaizu, Minato-ku (JP); Toshimitsu Kikuchi, Minato-ku (JP); Takuya Sano, Minato-ku (JP)

(73) Assignee: ENEOS MATERIALS CORPORATION, Tokyo (JP)

( * ) Notice: Subject to any disclaimer, the term of this patent is extended or adjusted under 35 U.S.C. 154(b) by 691 days.

(21) Appl. No.: 17/438,699

(22) PCT Filed: Mar. 27, 2020

(86) PCT No.: PCT/JP2020/014380
§ 371 (c)(1),
(2) Date: Sep. 13, 2021

(87) PCT Pub. No.: WO2020/196899
PCT Pub. Date: Oct. 1, 2020

(65) Prior Publication Data
US 2022/0153971 A1     May 19, 2022

(30) Foreign Application Priority Data
Mar. 27, 2019 (JP) .................. 2019-061722

(51) Int. Cl.
C08L 15/00 (2006.01)
B60C 1/00 (2006.01)
C08C 19/02 (2006.01)
C08C 19/22 (2006.01)
C08C 19/25 (2006.01)
C08K 3/36 (2006.01)

(52) U.S. Cl.
CPC ............ C08L 15/00 (2013.01); B60C 1/0016 (2013.01); B60C 1/0025 (2013.01); C08C 19/02 (2013.01); C08C 19/22 (2013.01); C08C 19/25 (2013.01); C08K 3/36 (2013.01)

(58) Field of Classification Search
CPC ...... C08C 19/02; C08F 212/08; C08F 236/06; C08K 5/5419; C08K 5/544; C08K 5/5465; B60C 1/0016; B60C 1/0025
USPC .................................. 525/102, 105
See application file for complete search history.

(56) References Cited

U.S. PATENT DOCUMENTS

| | | |
|---|---|---|
| 2003/0100683 A1 | 5/2003 | Toyoizumi et al. |
| 2009/0264591 A1 | 10/2009 | Sano et al. |
| 2010/0152369 A1 | 6/2010 | Shibata et al. |
| 2010/0190885 A1 | 7/2010 | Hua et al. |
| 2011/0172344 A1 | 7/2011 | Yoshida et al. |
| 2011/0319519 A1 | 12/2011 | Sone et al. |
| 2013/0018151 A1 | 1/2013 | Maeda et al. |
| 2015/0361210 A1 | 12/2015 | Nosaka et al. |
| 2016/0122480 A1 | 5/2016 | Cho et al. |
| 2017/0204205 A1 | 7/2017 | Choi et al. |
| 2017/0275390 A1 | 9/2017 | Bae et al. |
| 2018/0201065 A1 | 7/2018 | Adachi et al. |
| 2019/0184747 A1 | 6/2019 | Kyo et al. |

(Continued)

FOREIGN PATENT DOCUMENTS

| | | |
|---|---|---|
| CN | 107735412 A | 2/2018 |
| EP | 1 245 585 A2 | 10/2002 |

(Continued)

OTHER PUBLICATIONS

Combined Taiwanese Office Action and Search Report issued Sep. 7, 2023, in corresponding Taiwanese Patent Application No. 109110572 (with English Translation), 8 pages.

(Continued)

*Primary Examiner* — Fred M Teskin
(74) *Attorney, Agent, or Firm* — Oblon, McClelland, Maier & Neustadt, L.L.P.

(57) ABSTRACT

A hydrogenated conjugated diene-based polymer which has a structure formed by bonding a nitrogen-containing compound having two or more alkoxysilyl groups and two or more nitrogen atoms with a plurality of conjugated diene-based polymer chains, wherein: when a composition ratio (molar ratio) in the hydrogenated conjugated diene-based polymer of each of a structural unit represented by formula (1), a structural unit represented by formula (2), a structural unit represented by formula (3), and a structural unit represented by formula (4) is p, q, r, and s, respectively, a value a represented by formula (i) is 0.80 or more and 0.97 or less, and an equilibrium storage modulus E' of the hydrogenated conjugated diene-based polymer is 2.4 MPa or more, $$\alpha = (p+(0.5 \times r))/(p+q+(0.5 \times r)+s) \quad (i)$$

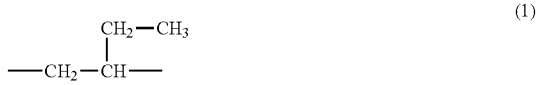

(1)

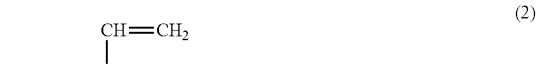

(2)

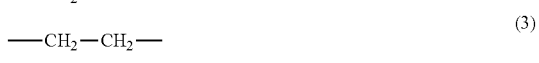

(3)

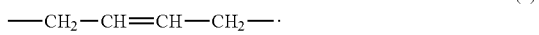

(4)

20 Claims, No Drawings

(56) References Cited

U.S. PATENT DOCUMENTS

| | | |
|---|---|---|
| 2019/0194430 A1 | 6/2019 | Morishita et al. |
| 2020/0002454 A1 | 1/2020 | Lee et al. |

FOREIGN PATENT DOCUMENTS

| | | |
|---|---|---|
| EP | 2 055 737 A1 | 5/2009 |
| EP | 2 213 477 A1 | 8/2010 |
| EP | 2 338 919 A1 | 6/2011 |
| EP | 2 407 507 A1 | 1/2012 |
| EP | 3 225 636 A1 | 10/2017 |
| EP | 3 594 251 A1 | 1/2020 |
| JP | 63-4841 B2 | 2/1988 |
| JP | 1-37970 B2 | 8/1989 |
| JP | 11-349632 A | 12/1999 |
| JP | 2004-168904 A | 6/2004 |
| WO | WO 2008/123164 A1 | 10/2008 |
| WO | WO 2014/133097 A1 | 9/2014 |
| WO | WO 2017/014283 A1 | 1/2017 |
| WO | WO 2017/086208 A1 | 5/2017 |
| WO | WO 2017/221943 A1 | 12/2017 |
| WO | WO 2018/034195 A1 | 2/2018 |
| WO | WO 2018/128291 A1 | 7/2018 |
| WO | WO 2018/164053 A1 | 9/2018 |

OTHER PUBLICATIONS

Extended European Search Report issued Apr. 25, 2022 in European Patent Application No. 20776806.0, 7 pages.

Combined Chinese Office Action and Search Report issued Oct. 9, 2022 in Chinese Patent Application No. 202080011971.X (with unedited computer generated English Translation), 22 pages.

International Search Report issued on Jun. 23, 2020 in PCT/JP2020/014380 filed Mar. 27, 2020, 3 pages.

Japanese Office Action issued Dec. 5, 2023 in Japanese Application 2021-509689, (with unedited computer-generated English translation), 8 pages.

Japanese Office Action issued May 28, 2024 in Japanese Patent Application No. 2021-509689 (with unedited computer-generated English translation), 6 pages.

Japanese Office Action issued Sep. 3, 2024 in Japanese Patent Application No. 2021-509689, (with unedited, machine-generated English translation), 6 pages.

HYDROGENATED CONJUGATED DIENE POLYMER, POLYMER COMPOSITION, CROSSLINKED BODY AND TIRE

CROSS-REFERENCE TO RELATED APPLICATIONS

The present application is based on Japanese Patent Application No. 2019-61722, filed Mar. 27, 2019, the contents of which are incorporated herein by reference in their entirety.

TECHNICAL FIELD

This disclosure relates to a hydrogenated conjugated diene-based polymer, a polymer composition, a crosslinked body, and a tire.

BACKGROUND ART

Conjugated diene-based polymers obtained by polymerization using a conjugated diene compound exhibit good properties, such as thermal resistance, wear resistance, mechanical strength, and molding processability, and thus have been widely used in various industrial products, such as pneumatic tires, anti-vibration rubber, and hoses.

The rubber compositions used for treads, sidewalls, and the like of pneumatic tires have been known to contain a reinforcing agent, such as carbon black or silica, in addition to a conjugated diene-based polymer in the rubber composition in order to improve the durability and wear resistance of the product. Further, conventionally, in order to enhance the affinity between the conjugated diene-based polymer and the reinforcing agent, a modified conjugated diene-based polymer obtained by modifying a conjugated diene-based polymer with a compound having silicon or nitrogen has been used (see, e.g., Patent Documents 1 to 3).

In recent years, it has been proposed to obtain a tire member having high strength and low wear by using a hydrogenated product of a modified conjugated diene-based polymer having a functional group such as an amino group or an alkoxysilyl group at one end or both ends (see Patent Document 4).

PRIOR ART DOCUMENTS

Patent Documents

Patent Document 1: WO 2008/123164
Patent Document 2: JP-A-H11-349632
Patent Document 3: WO 2017/221943
Patent Document 4: WO 2014/133097

SUMMARY OF INVENTION

Technical Problem

Due to the recent environmental situation and increased awareness of resource saving and energy saving, there is a desire to extend the life of rubber products and increase the number of years of use, and to reduce the weight and size of products while maintaining performance. Therefore, there is a demand for a material capable of obtaining a crosslinked rubber having higher strength than before and excellent wear resistance.

This disclosure was made in view of the problems described above, and one object of the present invention is to provide a hydrogenated conjugated diene-based polymer capable of obtaining a crosslinked rubber having high strength and excellent wear resistance.

Solution to Problem

This disclosure provides the following hydrogenated conjugated diene-based polymer, polymer composition, crosslinked body, and tire.

[1] A hydrogenated conjugated diene-based polymer, which has a structure formed by bonding a nitrogen-containing compound having two or more alkoxysilyl groups and two or more nitrogen atoms with a plurality of conjugated diene-based polymer chains, wherein when a composition ratio (molar ratio) in the polymer of a structural unit represented by formula (1), a structural unit represented by formula (2), a structural unit represented by formula (3), and a structural unit represented by formula (4) are p, q, r, and s, respectively, a value a represented by formula (i) is 0.80 or more and 0.97 or less, and an equilibrium storage modulus E' is 2.4 MPa or more.

$$\alpha = (p+(0.5 \times r))/(p+q+(0.5 \times r)+s) \quad (i)$$

[F1]

(1)

(2)

(3)

(4)

[2] A polymer composition, including the hydrogenated conjugated diene-based polymer of [1] and an inorganic filler.
[3] A crosslinked body produced through crosslinking of the polymer composition of [2].
[4] A tire wherein one or both of a tread and a sidewall are formed using the polymer composition of [2].

Advantageous Effects of Invention

According to the hydrogenated conjugated diene-based polymer of this disclosure, it is possible to obtain a crosslinked rubber having high strength and excellent wear resistance.

DESCRIPTION OF EMBODIMENTS

The matters relating to the implementation of this disclosure will be described in detail below.

<Hydrogenated Conjugated Diene-Based Polymer>

The hydrogenated conjugated diene-based polymer of the present disclosure is a polymer having a terminal modified by a compound having a plurality of silicon atoms and a plurality of nitrogen atoms. Specifically, the hydrogenated conjugated diene-based polymer is a polymer satisfying the following (a), (b) and (c).

(a) Have a structure formed by bonding a nitrogen-containing compound having two or more alkoxysilyl groups and two or more nitrogen atoms with a plurality of conjugated diene-based polymer chains.

(b) Have a hydrogenation ratio of 80% or more and 97% or less.

(c) Have an equilibrium storage modulus ET of 2.4 MPa or more.

A hydrogenated conjugated diene-based polymer satisfying the above (a) to (c) is produced by a method including the following polymerization step, modification step, and hydrogenation step.

<Polymerization Step>

This step is a step of polymerizing a monomer containing a conjugated diene compound to obtain a conjugated diene-based polymer having an active terminal. Examples of the conjugated diene compound used for polymerization include 1,3-butadiene, isoprene, 2,3-dimethyl-1,3-butadiene, 1,3-pentadiene, 1,3-hexadiene, 1,3-heptadiene, 2-phenyl-1,3-butadiene, 3-methyl-1,3-pentadiene, and 2-chloro-1,3-butadiene. Among these, at least one selected from the group consisting of 1,3-butadiene, isoprene, and 2,3-dimethyl-1,3-butadiene is preferable, and at least one of 1,3-butadiene and isoprene is more preferable.

The conjugated diene-based polymer may be a homopolymer of the conjugated diene compound, but from the viewpoint of increasing the strength of the rubber, it is preferably a copolymer of a conjugated diene compound and an aromatic vinyl compound. Examples of the aromatic vinyl compound used for the polymerization include styrene, 2-methylstyrene, 3-methylstyrene, 4-methylstyrene, α-methylstyrene, 2,4-dimethylstyrene, 2,4-diisopropylstyrene, 4-t-butylstyrene, 5-t-butyl-2-methylstyrene, vinylethylbenzene, divinylbenzene, trivinylbenzene, divinylnaphthalene, t-butoxystyrene, vinylbenzyldimethylamine, (4-vinylbenzyl)dimethylaminoethyl ether, N,N-dimethylaminoethylstyrene, N,N-dimethylaminomethylstyrene, 2-ethylstyrene, 3-ethylstyrene, 4-ethylstyrene, 2-t-butylstyrene, 3-t-butylstyrene, vinylxylene, vinylnaphthalene, vinylpyridine, diphenylethylene, and a tertiary amino group-containing diphenylethylene (e.g., 1-(4-N,N-dimethylaminophenyl)-1-phenylethylene). Among these, styrene and α-methylstyrene are preferable as the aromatic vinyl compound.

When the conjugated diene-based polymer is a copolymer of a conjugated diene compound and an aromatic vinyl compound, from the viewpoint of having high living properties in anionic polymerization, the conjugated diene-based polymer is preferably, among these, a polymer including 1,3-butadiene and styrene in the monomer composition. From the viewpoint that the dispersibility of a filler can be further improved, the copolymer preferably has a random copolymer moiety in which the distribution of the conjugated diene compound and the aromatic vinyl compound is irregular. When the copolymer is a random copolymer, the copolymer may further have a block moiety composed of the conjugated diene compound or the aromatic vinyl compound together with the random copolymer moiety.

When the conjugated diene-based polymer is a copolymer of a conjugated diene compound and an aromatic vinyl compound, from the viewpoint of improving the balance between the low hysteresis loss properties and the wet skid resistance of the obtained crosslinked polymer, and from the viewpoint of obtaining a higher strength crosslinked rubber, the proportion of the aromatic vinyl compound used is preferably 5 to 50% by mass, and preferably 10 to 45% by mass, based on the total amount of the conjugated diene compound and the aromatic vinyl compound used for the polymerization. The content ratio of the structural unit derived from the aromatic vinyl compound in the polymer is a value measured by $^1$H-NMR. As the conjugated diene compound and the aromatic vinyl compound, one type of each may be used alone, or two or more types may be used in combination.

In the polymerization, a compound other than the conjugated diene compound and the aromatic vinyl compound (hereinafter, also referred to as "another monomer") may be used as a monomer. Examples of another monomer include acrylonitrile, methyl (meth)acrylate, and ethyl (meth)acrylate. The proportion of another monomer used is preferably 10% by mass or less, and more preferably 5% by mass or less, based on the total amount of the monomers used for the polymerization.

As the polymerization method to be used, any of a solution polymerization method, a gas phase polymerization method, and a bulk polymerization method may be used, but a solution polymerization method is particularly preferable. Further, as the polymerization type, either a batch type or a continuous type may be used. When a solution polymerization method is used, an example of a specific polymerization method is a method in which a monomer including the conjugated diene compound is added to an organic solvent in the presence of a polymerization initiator and, optionally, a randomizer.

As the polymerization initiator, an alkali metal compound is preferably used. Specific examples of the alkali metal compound include alkyllithiums such as methyllithium, ethyllithium, n-propyllithium, n-butyllithium, sec-butyllithium, and t-butyllithium; 1,4-dilithiobutane, phenyllithium, stilbenlithium, naphthyllithium, 1,3-bis(1-lithio-1,3-dimethylpentyl)benzene, 1,3-phenylenebis(3-methyl-1-phenylpentylidene)dilithium, sodium naphthyl, potassium naphthyl, and ethoxypotassium. Of these, the alkali metal compound used as a polymerization initiator is preferably a lithium compound.

Further, the polymerization reaction may be carried out in the presence of a compound (R) obtained by mixing the above-described alkali metal compound with a compound having a functional group that interacts with silica (hereinafter, this compound is also referred to as "initiation modifier"). By carrying out the polymerization in the presence of the compound (R), a functional group that interacts with silica can be introduced into the polymerization initiation terminal of the conjugated diene-based polymer. As used herein, the term "interaction" means that a covalent bond is formed between molecules, or an intermolecular force (e.g., an intermolecular electromagnetic force such as ion-dipole interaction, dipole-dipole interaction, a hydrogen bond, or Van der Waals force) that is weaker than a covalent bond is formed. Further, the phrase "functional group that interacts with silica" means a group having at least one atom that interacts with silica, such as a nitrogen atom, a sulfur atom, a phosphorus atom, or an oxygen atom.

The compound (R) is especially preferably a reaction product of a lithium compound such as alkyllithium and a compound having a nitrogen atom. The initiation modifier to be reacted with the lithium compound is preferably a secondary amine compound, and specific examples thereof include dimethylamine, diethylamine, dipropylamine, dibutylamine, dodecamethyleneimine, N,N'-dimethyl-N'-trimethylsilyl-1,6-diaminohexane, piperidine, pyrrolidine, hexamethyleneimine, heptamethyleneimine, dicyclohexylamine, N-methylbenzylamine, di-(2-ethylhexyl)amine, diallylamine, morpholin, N-(trimethylsilyl)piperazine, N-(tert-butyldimethylsilyl)piperazine, and 1,3-ditrimethylsilyl-1,3,5-triazinane.

In the case of carrying out the polymerization in the presence of the compound (R), the compound (R) may be prepared by mixing the alkali metal compound and the initiation modifier in advance, and the polymerization carried out by adding the prepared compound (R) to the polymerization system. Alternatively, the polymerization may be carried out by adding the alkali metal compound and the initiation modifier to the polymerization system and mixing them in the polymerization system to prepare the compound (R). The amount of the polymerization initiator used (the total amount when two or more types are used) is preferably 0.01 to 20 mmol, and more preferably 0.05 to 15 mmol, based on 100 g of the monomer used for the synthesis of the polymer.

The randomizer may be used to adjust a vinyl bond content that represents the content ratio of vinyl bonds in the polymer, for example. Examples of the randomizer include dimethoxybenzene, tetrahydrofuran, dimethoxyethane, diethylene glycol dibutyl ether, diethylene glycol dimethyl ether, 2,2-di(tetrahydrofuryl)propane, 2-(2-ethoxyethoxy)-2-methylpropane, triethylamine, pyridine, N-methylmorpholine, and tetramethylethylenediamine. These compounds may be used either alone or in combination of two or more.

The organic solvent used for polymerization may be an organic solvent that is inert to the reaction. For example, aliphatic hydrocarbons, alicyclic hydrocarbons, and aromatic hydrocarbons can be used. Of these, the organic solvent is preferably a hydrocarbon having 3 to 8 carbon atoms. Specific examples of the hydrocarbon having 3 to 8 carbon atoms include propane, n-butane, isobutane, n-pentane, isopentane, n-hexane, cyclohexane, propene, 1-butene, isobutene, trans-2-butene, cis-2-butene, 1-pentyne, 2-pentyne, 1-hexene, 2-hexene, benzene, toluene, xylene, ethylbenzene, heptane, cyclopentane, methylcyclopentane, methylcyclohexane, 1-pentene, 2-pentene, and cyclohexene. These organic solvents may be used either alone or in combination of two or more.

When using the solution polymerization method, the monomer concentration in the reaction solvent is preferably 5 to 50% by mass, and more preferably 10 to 30% by mass, since such a monomer concentration enables a balance to be maintained between productivity and polymerization controllability. The polymerization reaction temperature is preferably −20° C. to 150° C., and more preferably 0 to 120° C. It is preferable to carry out the polymerization reaction under a pressure sufficient to substantially maintain the monomer to be in a liquid phase. Such a pressure may be achieved by a method for pressurizing the inside of the reaction vessel using gas that is inert to the polymerization reaction, for example.

By carrying out the above-described polymerization reaction, a conjugated diene-based polymer having an active terminal can be obtained. The resultant conjugated diene-based polymer preferably has a weight average molecular weight (Mw) in terms of polystyrene of $5.0 \times 10^4$ to $1.0 \times 10^6$ as measured by gel permeation chromatography (GPC). A Mw of less than $5.0 \times 10^4$ may lead to a deterioration in the tensile strength, lower heat generation properties, and worse wear resistance of the resultant crosslinked rubber, whereas a Mw exceeding $1.0 \times 10^6$ may lead to poor processability of the rubber composition obtained by using the hydrogenated conjugated diene-based polymer. The Mw is more preferably $8.0 \times 10^4$ to $8.0 \times 10^5$, and further preferably $1.0 \times 10^5$ to $5.0 \times 10^5$.

The conjugated diene-based polymer obtained by the above-described polymerization preferably has a vinyl bond content in the structural unit derived from butadiene of 15 to 70% by mass. By setting the vinyl bond content to 25 mol % or more, the obtained crosslinked rubber tends to maintain flexibility, have good processability, and have excellent wear resistance in a low slip region. The vinyl bond content is preferably 18% by mass or more, and more preferably 20% by mass or more. From the viewpoint of durability, the vinyl bond content of the conjugated diene-based polymer is preferably 68% by mass or less, and more preferably 65% by mass or less. As used herein, the term "vinyl bond content" is a value indicating the content ratio of the structural unit having a 1,2-bond with respect to the total structural units derived from butadiene that the conjugated diene-based polymer has before hydrogenation, and is a value measured by $^1$H-NMR.

<Modification Step>

In this step, the active terminal of the conjugated diene-based polymer obtained in the above polymerization step and a compound having two or more alkoxysilyl groups and two or more nitrogen atoms (hereinafter, also referred to as "specific compound") are reacted. By using the specific compound as a terminal modifier, a modified conjugated diene-based polymer having a branched structure in which the number of branched polymer chains is 2 or more and that is modified with a group that interacts with silica can be obtained.

The specific compound has a plurality of reaction points capable of reacting with the active terminal of the conjugated diene-based polymer. The number of alkoxysilyl groups (that is, the number of silicon atoms to which at least one alkoxy group is bonded) of the specific compound determines is, from the viewpoint of achieving both strength and wear resistance of the obtained vulcanized rubber and processability of the rubber composition, preferably 2 to 6, and more preferably 2 to 4. Further, it is preferable that active hydrogens are not bonded to the nitrogen atoms of the specific compound. The number of nitrogen atoms of the specific compound is preferably 2 to 12. As used herein, "active hydrogen" refers to a hydrogen atom bonded to an atom other than a carbon atom, and preferably has a lower binding energy than the carbon-hydrogen bond of polymethylene.

As the specific compound, at least one compound selected from the group consisting of compounds represented by formula (5) and compounds represented by formula (6) can be preferably used.

[F2]

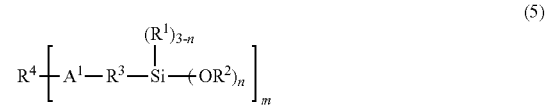

(5)

In formula (5), $R^1$ and $R^2$ are each independently a hydrocarbyl group having 1 to 20 carbon atoms, $R^3$ is an alkanediyl group having 1 to 20 carbon atoms, and $A^1$ is a group "*—C($R^5$)=N—" or a group "*—N=C($R^5$)—" (where $R^5$ is a hydrogen atom or hydrocarbyl group, and "*" represents a bond that binds to $R^4$); $R^4$ is an m-valent hydrocarbon group having 1 to 20 carbon atoms, or is an m-valent group having 1 to 20 carbon atoms that has at least one atom selected from the group consisting of a nitrogen atom, an oxygen atom, and a sulfur atom, and in which no active hydrogen is bonded to that at least one atom; n is an integer of 1 to 3, and m is an integer of 2 to 10; a plurality of $R^1$, $R^2$, $R^3$, $A^1$, and n are the same group or different groups.

[F3]

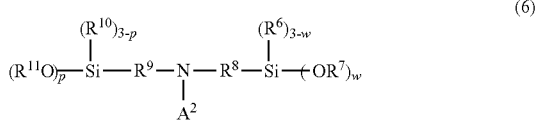

(6)

In formula (6), $R^6$, $R^7$, $R^{10}$, and $R^{11}$ are each independently a hydrocarbyl group having 1 to 20 carbon atoms, $R^8$ and $R^9$ are each independently an alkanediyl group having 1 to 20 carbon atoms, and $A^2$ is a group represented by the following formula (7), a group represented by the following formula (8), a group represented by the following formula (9), or a group represented by the following formula (10); w and p are each independently an integer of 1 to 3; and a plurality of $R^6$, $R^7$, $R^{10}$, and $R^{11}$ are the same group or different groups, respectively.

[F4]

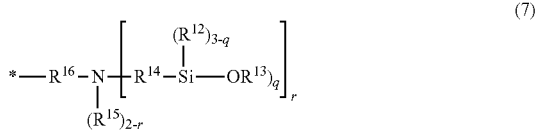

(7)

In formula (7), $R^{12}$, $R^{13}$, and $R^{15}$ are each independently a hydrocarbyl group having 1 to 20 carbon atoms, $R^{14}$ and $R^{16}$ are each independently an alkanediyl group having 1 to 20 carbon atoms, q is an integer of 1 to 3, and r is an integer of 0 to 2; a plurality of $R^{12}$ to $R^{15}$ and q are the same group or different groups, respectively; and "*" represents a bond that binds to the nitrogen atom in formula (2).

[F5]

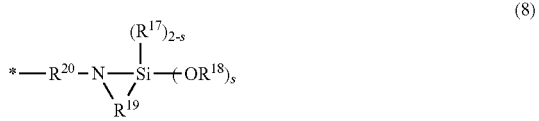

(8)

In formula (8), $R^{19}$ is an alkanediyl group having 3 to 20 carbon atoms, and the nitrogen atom and the silicon atom in the formula form a ring structure of 5 or more members; $R^{17}$ and $R^{18}$ are each independently a hydrocarbyl group having 1 to 20 carbon atoms, $R^{20}$ is an alkanediyl group having 1 to 20 carbon atoms, and s is 1 or 2; a plurality of $R^{17}$ and $R^{18}$ are the same group or different groups, respectively; and "*" represents a bond that binds to the nitrogen atom in formula (6).

[F6]

(9)

In formula (9), $R^{23}$ is an alkanediyl group having 1 to 20 carbon atoms, $R^{21}$ is a hydrocarbylidene group having 1 to 20 carbon atoms, and $R^{22}$ is an alkanediyl group or an alkenediyl group having 1 to 20 carbon atoms, and forms a ring structure of 5 or more members together with two adjacent nitrogen atoms; and "*" represents a bond that binds to the nitrogen atom in formula (6).

[F7]

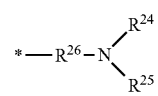

(10)

In formula (10), $R^{26}$ is a hydrocarbylene group having 1 to 20 carbon atoms, and $R^{24}$ and $R^{25}$ are each independently a hydrocarbyl group having 1 to 20 carbon atoms, or $R^{24}$ and $R^{25}$ together represent a ring structure of 4 to 20 carbon atoms formed together with the nitrogen atom to which $R^{24}$ and $R^{25}$ are bonded, or $R^{24}$ and $R^{25}$ together represent a ring structure of 5 or more members formed together with the nitrogen atom to which $R^{24}$ and $R^{25}$ are bonded and a nitrogen atom different from the nitrogen atom to which $R^{24}$ and $R^{25}$ are bonded or an oxygen atom; and "*" represents a bond that binds to the nitrogen atom in formula (6).

(Compound Represented by Formula (5))

In formula (5), examples of the hydrocarbyl group of $R^1$ and $R^2$ include an alkyl group having 1 to 20 carbon atoms, an allyl group, a cycloalkyl group having 3 to 20 carbon atoms, an aryl group having 6 to 20 carbon atoms, and the like. The alkanediyl group of $R^3$ preferably has 1 to 10 carbon atoms, and more preferably 2 to 10 carbon atoms. $R^3$ is preferably linear.

The hydrocarbyl group of $R^5$ possessed by $A^1$ may be the same as those described for $R^1$ and $R^2$. From the viewpoint of a greater improvement in silica dispersibility, n is preferably 2 or 3, and more preferably 3.

Examples of the m-valent hydrocarbon group of $R^4$ include groups in which m-hydrogen atoms have been removed from a chain hydrocarbon having 1 to 20 carbon atoms, an alicyclic hydrocarbon having 3 to 20 carbon atoms, and an aromatic hydrocarbon having 6 to 20 carbon atoms. Specific examples of the aromatic hydrocarbon include a ring structure represented by formula (11), and a polycyclic structure (e.g., a biphenyl group) in which two or more of the ring structures are linked.

[F8]

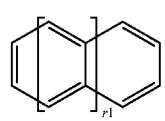

(11)

In formula (11), r1 is an integer from 0 to 5.

Preferred specific examples of the case where $R^4$ is an m-valent group having 1 to 20 carbon atoms that has at least one atom selected from the group consisting of a nitrogen atom, an oxygen atom, and a sulfur atom, and in which no active hydrogen is bonded to that at least one atom, include an m-valent heterocyclic group and an m-valent group having a tertiary amine structure. The heterocyclic group is preferably a conjugated heterocyclic group, and examples thereof include groups in which the number m of hydrogen atoms have been removed from the ring portion of a monocyclic or condensed ring such as pyridine, pyrimidine, pyrazine, quinoline, naphthalidine, furan, and thiophene, or of a structure in which a plurality of the monocyclic or condensed rings are linked. From the viewpoint of the processability of the rubber composition, m is an integer from 2 to 10, and is preferably from 2 to 6.

Specific examples of the compound represented by formula (5) include compounds represented by each of the following formulas (M-1) to (M-4), for example. $R^{25}$ in formula (M-1) represents a hydrogen atom or an alkyl group, and n1 denotes an integer of 1 to 8.

[F9]

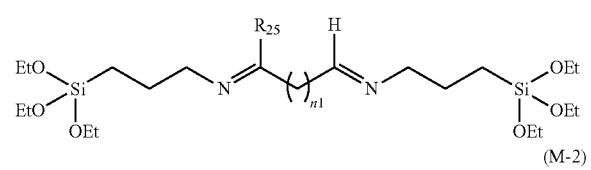
(M-1)

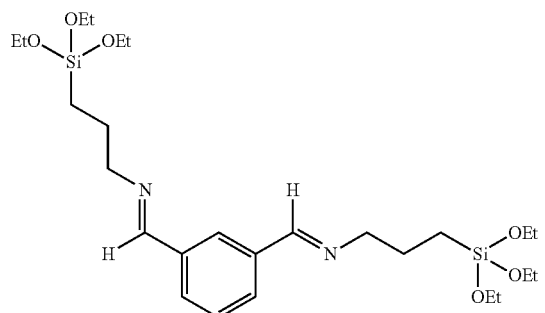
(M-2)

(M-3)

(M-4)

(Compound Represented by Formula (6))

In formulas (6) to (10), examples of the hydrocarbyl group having 1 to 20 carbon atoms of $R^6$, $R^7$, $R^{10}$, $R^{11}$, $R^{12}$, $R^{13}$, $R^{15}$, $R^{17}$, $R^{18}$, $R^{24}$, and $R^{25}$ include an alkyl group having 1 to 20 carbon atoms, an allyl group, a cycloalkyl group having 3 to 20 carbon atoms, and an aryl group having 6 to 20 carbon atoms. The alkanediyl group, alkenediyl group, and hydrocarbylidene group having 1 to 20 carbon atoms of $R^8$, $R^9$, $R^{14}$, $R^{16}$, $R^{20}$, $R^{21}$, $R^{22}$, $R^{23}$, and $R^{24}$ preferably have 1 to 10 carbon atoms, and more preferably 2 to 10 carbon atoms. $R^{19}$ preferably has 3 to 10 carbon atoms, and more preferably 3 to 5 carbon atoms.

In formula (8), the ring structure formed by $R^{19}$, a nitrogen atom, and a silicon atom is preferably a 5- to 7-membered ring, and more preferably a 5- or 6-membered ring. In formula (9), the ring structure formed by $R^{21}$, $R^{22}$, and two adjacent nitrogen atoms is preferably a 5- to 12-membered ring, and more preferably a 5- to 7-membered ring.

In formula (10), when $R^{24}$ and $R^{25}$ together represent a ring structure having 4 to 20 carbon atoms formed by $R^{24}$ and $R^{25}$ together with the nitrogen atom to which $R^{24}$ and $R^{25}$ are bonded, the ring structure preferably has 4 to 9 carbon atoms, and more preferably 4 to 6 carbon atoms. When $R^{24}$ and $R^{25}$ together represent a ring structure of 5 or more members formed together with the nitrogen atom to which $R^{24}$ and $R^{25}$ are bonded and a nitrogen atom different from the nitrogen atom to which $R^{24}$ and $R^{25}$ are bonded or an oxygen atom, the ring structure is preferably a 5- to 10-membered ring, and more preferably a 5- to 7-membered ring. Specific examples of the ring structure having five or more members include a piperazine ring structure, and a morpholine ring structure.

From the viewpoint of a greater improvement in silica dispersibility, w, p, and q are preferably 2 or 3, and more preferably 3. For the same reason, s is preferably 2.

Specific examples of the compound represented by formula (6) include, respectively, as compounds in which $A^2$ in formula (6) is a group represented by formula (7), N,N,N', N'-tetra(3-trimethoxysilylpropyl)ethylenediamine, N,N,N', N'-tetra(3-triethoxysilylpropyl)ethylenediamine, N,N,N'-tris(3-trimethoxysilylpropyl)-N'-methyl-ethylenediamine, N,N,N',N'-tetra(3-trimethoxysilylpropyl)-1,3-propanediamine, N,N,N',N'-tetra(3-trimethoxysilylpropyl)-1,4-butanediamine, and bis(3-trimethoxysilylpropyl)-[2-(dimethylamino)ethyl]amine;

as compounds in which $A^2$ in formula (6) is a group represented by formula (8), bis(3-trimethoxysilylpropyl)-[2-(2,2-dimethoxy-1-aza-2-silacyclopentane) ethyl]amine, bis(3-triethoxysilylpropyl)-[2-(2,2-diethoxy-1-aza-2-silacyclopentane)ethyl]amine, bis(3-trimethoxysilylpropyl)-[3-(2,2-dimethoxy-1-aza-2-silacyclopentane)propyl]amine, bis(3-trimethoxysilylpropyl)-[2-(2,2-dimethoxy-1-aza-2-silacyclohexane)ethyl]amine, and bis(3- trimethoxysilylpropyl)-[2-(2,2-dimethoxy-1-aza-2-silacyclooctane)ethyl]amine;

as compounds in which $A^2$ in formula (6) is represented by formula (9), N,N-bis(3-trimethoxysilylpropyl)-3-imidazolylpropylamine; and as compounds in which $A^2$ in formula (6) is a group represented by formula (10), bis(3-trimethoxysilylpropyl)-(3-dimethylaminopropyl)amine.

The reaction between the conjugated diene-based polymer having an active terminal and the specific compound is preferably carried out as a solution reaction. From the viewpoint of causing the modification reaction to sufficiently proceed, and of obtaining a crosslinked rubber having high strength, high wear resistance, and a larger improvement in fuel efficiency, the proportion of the specific compound used (when two or more specific compounds are used, the total amount thereof) is preferably 0.01 mol or more, and more preferably 0.05 mol or more, with respect to 1 mol of the metal atom involved in the polymerization that the polymerization initiator has. Further, in order to avoid a deterioration in processability and excessive addition, the proportion of the specific compound used is preferably less than 2.0 mol, and more preferably less than 1.5 mol, with respect to 1 mol of the metal atom involved in the polymerization that the polymerization initiator has. One type of the specific compound may be used alone, or two or more types may be used in combination.

The temperature of the modification reaction is usually the same as that of the polymerization reaction, and is preferably –20° C. to 150° C., and more preferably 0 to 120° C. When the reaction temperature is low, the viscosity of the modified polymer tends to increase, and when the reaction temperature is high, the polymerization active terminal tends to be deactivated. The reaction time is preferably 1 minute to 5 hours, and more preferably 2 minutes to 1 hour.

In the reaction between the conjugated diene-based polymer having an active terminal and the specific compound, a compound different from the specific compound (hereinafter, referred to as "another modifier or coupling agent") may be used together with the specific compound. Another modifier or coupling agent is not particularly limited as long as it is a compound capable of reacting with the active terminal of the conjugated diene-based polymer obtained by the above-described polymerization, and a compound known as a modifier or coupling agent of conjugated diene-based polymers (e.g., a nitrogen-containing alkoxysilane compound, glycidyl group-containing polysiloxane other than the specific compound, and the like) can be used. When another modifier or coupling agent is used, the proportion of their use is preferably 10 mol % or less, and more preferably 5 mol % or less.

The modified conjugated diene-based polymer included in the reaction solution can be isolated by a known desolvation method, such as steam stripping, and then performing a drying operation, such as a heat treatment.

<Hydrogenation Step>

In the hydrogenation step, the modified conjugated diene-based polymer obtained by the modification step is hydrogenated. The hydrogenation reaction can be performed by any method under any conditions, so long as a modified conjugated diene-based polymer having the desired hydrogenation ratio is obtained. Examples of those hydrogenation methods include a method involving the use of a catalyst containing an organometallic compound of titanium as a main component of a hydrogenation catalyst; a method involving the use of a catalyst containing an organic compound of iron, nickel, or cobalt and an organometallic compound such as an alkylaluminum; a method involving the use of an organic complex of an organometallic compound of, for example, ruthenium or rhodium; and a method involving the use of a catalyst including a carrier (e.g., carbon, silica, or alumina) on which a metal such as palladium, platinum, ruthenium, cobalt, or nickel is supported, and the like. Among the various methods, a method in which hydrogenation is carried out under mild conditions of low pressure and low temperature using an organometallic compound of titanium alone, or a uniform catalyst composed of an organometallic compound of titanium and an organometallic compound of lithium, magnesium, and aluminum (JP-A-S63-4841 and JP-A-H1-37970) is industrially preferable, hydrogenation selectivity for the double bond of butadiene is also high, and is suitable for the purpose of this disclosure.

The hydrogenation of the modified conjugated diene-based polymer obtained by the above modification step is preferably carried out using a solvent that is inert to the catalyst and in which the conjugated diene-based polymer is soluble. Preferred solvents include aliphatic hydrocarbons such as n-pentane, n-hexane, and n-octane, alicyclic hydrocarbons such as cyclohexane and cycloheptane, aromatic hydrocarbons such as benzene and toluene, and ethers such as diethyl ether and tetrahydrofuran, which are used alone or as a mixture in which these solvents are a main component.

The hydrogenation reaction is generally carried out by holding the conjugated diene-based polymer at a predetermined temperature under a hydrogen or an inert atmosphere, adding a hydrogenation catalyst under stirring or non-stirring, and then increasing the pressure to a predetermined pressure by introducing hydrogen gas. The term "inert atmosphere" means an atmosphere that does not react with the substances involved in the hydrogenation reaction, and examples thereof include helium, neon, and argon. Air and oxygen are not preferable because they oxidize the catalyst and cause the catalyst to be deactivated. In addition, nitrogen is not preferable because it acts as a catalytic poison during the hydrogenation reaction and reduces the hydrogenation activity. In particular, it is most preferable that the hydrogenation reaction vessel has an atmosphere of hydrogen gas alone.

The hydrogenation reaction process for obtaining a hydrogenated conjugated diene-based polymer can be a batch process, a continuous process, or a combination thereof. When a titanocene diaryl compound is used as the hydrogenation catalyst, the titanocene diaryl compound may be added alone to the reaction solution as is, or may be added as a solution in an inert organic solvent. As the inert organic solvent used when the catalyst is used as a solution, various solvents that do not react with the substances involved in the hydrogenation reaction can be used. The inert organic solvent is preferably the same solvent as the solvent used for the hydrogenation reaction. A preferable added amount of the catalyst is 0.02 to 20 mmol per 100 g of conjugated diene-based polymer before hydrogenation.

In the hydrogenated conjugated diene-based polymer of this disclosure, when a composition ratio (molar ratio) in the polymer of a structural unit represented by formula (1), a structural unit represented by formula (2), a structural unit represented by formula (3), and a structural unit represented by formula (4) are p, q, r, and s, respectively, a value α represented by the following formula (i) is 0.80 or more and 0.97 or less.

$$\alpha = (p + (0.5 \times r))/(p + q + (0.5 \times r) + s) \quad \text{(i)}$$

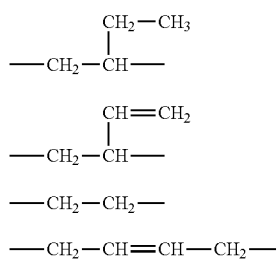

(1)

(2)

(3)

(4)

The hydrogenated conjugated diene-based polymer obtained by terminal modification using a specific compound can obtain a crosslinked rubber having high strength and excellent wear resistance when α is 0.80 or more and 0.97 or less. From the viewpoint that a crosslinked rubber having even better wear resistance (particularly, wear resistance at a low slip ratio) can be obtained, α is more preferably 0.84 or more, further preferably 0.86 or more, and particularly preferably 0.88 or more. In addition, α in formula (i) corresponds to the hydrogenation ratio of the hydrogenated conjugated diene-based polymer. For example, when α is 0.80, the hydrogenation ratio of the hydrogenated conjugated diene-based polymer is 800. Further, in order to obtain a crosslinked rubber having better fuel efficiency, α is more preferably 0.96 or less, and further preferably 0.95 or less. The hydrogenation ratio of the polymer can be adjusted based on the time of the hydrogenation reaction and the like. In the present specification, the hydrogenation ratio is a value measured by $^1$H-NMR.

In a preferable method for obtaining the hydrogenated conjugated diene-based polymer modified using the specific compound, a monomer including butadiene is subjected to solution polymerization in the presence of an alkali metal compound, the polymer is modified by the specific compound using the obtained polymer solution as it is, and then the hydrogenation step is carried out. Such a method is industrially useful. In this case, the hydrogenated conjugated diene-based polymer is obtained by being isolated from the obtained solution through removal of the solvent therefrom. The polymer can be isolated by a known desolvation method, such as steam stripping, and then performing a drying operation, such as a heat treatment.

From the viewpoint of obtaining a crosslinked rubber having high strength, low heat generation, and excellent wear resistance, the obtained hydrogenated conjugated diene-based polymer preferably has a weight average molecular weight (Mw) in terms of polystyrene of $1.5 \times 10^5$ to $2.0 \times 10^6$ as measured by gel permeation chromatography (GPC). The Mw of the hydrogenated conjugated diene-based polymer is more preferably $1.8 \times 10^5$ or more, and further preferably $2.0 \times 10^5$ or more. The Mw is more preferably $1.6 \times 10^6$ or less, and further preferably $1.4 \times 10^6$ or less. The weight average molecular weight of the hydrogenated conjugated diene-based polymer is a value obtained from the maximum peak molecular weight of the GPC curve measured by GPC after hydrogenating the reaction product of the conjugated diene-based polymer having an active terminal and the specific compound.

Further, the hydrogenated conjugated diene-based polymer obtained by the above-described production method preferably has a molecular weight distribution of the total amount of polymers (that is, the aggregate of the different molecular weights) measured by GPC of 1.1 or more and 2.0 or less. A molecular weight distribution of 1.1 or more is preferable because processability is excellent, and a molecular weight distribution of 2.0 or less is preferable because the fuel efficiency of the obtained vulcanized rubber can be sufficiently high. The molecular weight distribution of the hydrogenated conjugated diene-based polymer obtained by the above-described reaction is more preferably 1.20 or more, and further preferably 1.23 or more, and is more preferably 1.7 or less, and further preferably 1.5 or less.

Regarding the resultant hydrogenated conjugated diene-based polymer, a peak top molecular weight of the peak having the smallest molecular weight as measured by GPC is preferably in the range of $1.0 \times 10^5$ to $2.0 \times 10^6$. When the peak top molecular weight of the peak having the smallest molecular weight is $1.0 \times 10^5$ or more, the improvement in the strength and wear resistance of the resultant vulcanized rubber can be sufficiently increased, and cold flow properties are further improved, and so such a peak top molecular weight is preferable. The peak top molecular weight of the peak having the smallest molecular weight is more preferably $1.1 \times 10^5$ or more, and further preferably $1.2 \times 10^5$ or more. Further, in terms of further improving processability and viscoelastic properties, the peak top molecular weight of the peak having the smallest molecular weight is more preferably $1.8 \times 10^6$ or less, and further preferably $1.2 \times 10^6$ or less.

According to the production method described above, a hydrogenated conjugated diene-based polymer having a storage modulus (equilibrium storage modulus E') of 2.4 MPa or more as measured by a dynamic viscoelasticity test (measurement mode: tension, measurement temperature: −80° C. to 150° C., heating rate: 5° C./min, tensile strain: 0.1%, frequency: 1 Hz) can be obtained. When the equilibrium storage modulus E' of the hydrogenated conjugated diene-based polymer modified using the specific compound is 2.4 MPa or more, a vulcanized rubber having high strength and greatly improved wear resistance (particularly, wear resistance at a low slip ratio) can be obtained, which is preferable. From this point of view, the equilibrium storage modulus E' is preferably 2.6 or more, and more preferably 2.8 or more. Further, from the viewpoint of sufficiently ensuring the processability of the obtained polymer composition, the equilibrium storage modulus E' of the hydrogenated conjugated diene-based polymer is preferably 5.0 or less, more preferably 4.5 or less, and further preferably 4.2 or less. The equilibrium storage modulus E' can be adjusted based on, for example, the hydrogenation ratio of the polymer. At this time, setting a higher hydrogenation ratio tends to increase the equilibrium storage modulus E'.

According to the production method described above, a hydrogenated conjugated diene-based polymer can be obtained that has a branched structure in which two or more conjugated diene-based polymer chains are bonded to the reaction site (alkoxysilyl group and the like) of the specific compound, and that has a hydrogenation ratio of 80 to 97%. Further, by reacting a modifier (specific compound) having a plurality of nitrogen atoms and a plurality of alkoxysilyl groups with the conjugated diene-based polymer having an active terminal to form a highly branched structure, and setting a high hydrogenation ratio of 80 to 97%, a polymer having a high equilibrium storage modulus E' of 2.4 or more can be obtained. By using such a polymer, shape stability (storage stability) of a vulcanized rubber can be improved due to cold flow being sufficiently suppressed, and a vulcanized rubber can be obtained that has high strength and excellent wear resistance.

<Polymer Composition>

The polymer composition of this disclosure contains the above-described hydrogenated conjugated diene-based polymer and an inorganic filler. The content ratio of the hydrogenated conjugated diene-based polymer in the polymer composition is preferably 10% by mass or more, more preferably 20% by mass or more, and further preferably 25% by mass or more, based on the total amount of the polymer composition. Further, the content ratio of the hydrogenated conjugated diene-based polymer is preferably 50% by mass or less, and more preferably 40% by mass or less, based on the total amount of the polymer composition.

As the inorganic filler, one or both of silica and carbon black can be preferably used. Examples of the silica include wet silica (hydrous silicic acid), dry silica (silicic anhydride), colloidal silica, precipitated silica, calcium silicate, aluminum silicate, and the like. Of these, wet silica is particularly preferable from the viewpoint of the effect of improving break properties and the effect of achieving both wet grip and low rolling resistance. Further, it is also preferable to use a high dispersion type silica from the viewpoint that the dispersibility in the polymer composition can be improved, and the physical properties and processability can be improved. One type of silica can be used alone or two or more types can be used in combination.

Examples of the carbon black include, but are not particularly limited to, GPF, FEF, HAF, ISAF, SAF, and the like. A good reinforcing effect can be obtained by using carbon black as the inorganic filler. Further, the polymer composition may contain various reinforcing fillers, such as clay and calcium carbonate, in addition to silica and carbon black as the inorganic filler. Preferably, silica alone or a combination of carbon black and silica is used. The total amount of silica and carbon black in the polymer composition is preferably 20 to 130 parts by mass, and more preferably 25 to 110 parts by mass, with respect to 100 parts by mass of the total amount of the polymer components included in the polymer composition.

The polymer composition of this disclosure may contain a cross-linking agent. Examples of the cross-linking agent include sulfur, sulfur halides, organic peroxides, quinonedioximes, organic polyvalent amine compounds, and alkylphenol resins having a methylol group, and sulfur is usually used. The blended amount of sulfur is preferably 0.1 to 5 parts by mass, and more preferably 0.5 to 3 parts by mass, with respect to 100 parts by mass of the total amount of the polymer components included in the polymer composition.

The polymer composition of this disclosure may contain another rubber component in addition to the hydrogenated conjugated diene-based polymer obtained above. The type of such a rubber component is not particularly limited, and examples thereof include butadiene rubber (BR, for example, high-cis BR having 90% or more of cis-1,4 bonds, syndiotactic-1,2-polybutadiene (SPB)-containing BR), styrene butadiene rubber (SBR), natural rubber (NR), isoprene rubber (IR), styrene isoprene copolymer rubber, and butadiene isoprene copolymer rubber and BR and SBR are more preferable. The content ratio of another rubber component in the polymer composition is preferably 80% by mass or less, and more preferably 60% by mass or less, based on the total amount of the hydrogenated conjugated diene-based polymer and another rubber component.

The polymer composition may contain a process oil generally used for oil-extending an elastomer as an oil for oil extension. The process oil is blended into the rubber composition, for example, by adding the oil directly during the rubber blending. Preferred process oils include various oils known in the art, such as aromatic oils, paraffin oils, naphthenic oils, vegetable oils, and oils with a low content of polycyclic aromatic compounds (low PCA oils). Examples include mild extraction solvate (MES), treated distillate aromatic extract (TDAE), special residual aromatic extract (SRAE), and heavy naphthenic oils. Examples of commercially available MES, TDAE and SRAE include, for MES, Catenex SNR manufactured by Shell (heavy paraffin obtained by dewaxing distillate oil with a solvent), for TDAE, Vivatec 500 manufactured by H & R Wasag AG, for SRAE, NC140 manufactured by Japan Energy Corp. The blended amount of the process oil is preferably 10 to 100 parts by mass with respect to 100 parts by mass of the total amount of the polymer components included in the polymer composition.

In addition to the above-described components, the polymer composition can contain, for example, various additives generally used in rubber compositions for tires, such as an antioxidant, zinc oxide, stearic acid, a softening agent, sulfur, a vulcanization accelerator, a silane coupling agent, a compatibilizer, a vulcanization aid, a processing aid, and an anti-scorch agent. The blending ratios of these components can be appropriately selected according to each component as long as the effect of this disclosure is not impaired.

The polymer composition of this disclosure can be applied to various rubber products as a crosslinked body by kneading the polymer component and the inorganic filler, as well as the components to be optionally blended, using a kneader such as an open kneader (e.g., a roll), a closed kneader (e.g., a Banbury mixer), or the like, then molding, and after that and cross-linking (vulcanizing). Specifically, the crosslinked body can be applied to tire applications, such as a tire tread, an undertread, a carcass, a sidewall, and a bead; and applications such as sealing materials, such as packing, gaskets, weather strips, and O-rings; interior and exterior surface materials for various vehicles, such as automobiles, ships, aircraft, and trains; building materials; anti-vibration rubbers for industrial machines and equipment; various hoses and hose covers, such as diaphragms, rolls, radiator hoses, and air hoses; belts, such as belts for power transmission; linings; dust boots; materials for medical devices; fenders; insulating materials for electric wires; and other industrial products.

The hydrogenated conjugated diene-based polymer of this disclosure can obtain a crosslinked body that in addition strength and wear resistance, has good properties demanded in tire applications, such as fuel efficiency. Therefore, the polymer composition including the hydrogenated conjugated diene-based polymer of this disclosure can be particularly suitably used as a material of a tire tread, a sidewall, or both.

The tire can be produced by a customary method. For example, the polymer composition is mixed with a kneader to form a sheet, and the sheet is arranged at a predetermined position (e.g., in the case of a sidewall, the outer side of the carcass) and vulcanized by a customary method, to form a tread rubber or a sidewall rubber, whereby a pneumatic tire is obtained.

EXAMPLES

The following will specifically describe this disclosure based on examples, but this disclosure is not limited to these examples. Unless otherwise specified, the word "part(s)" and the symbol "%" described in the examples and comparative examples refer to "part(s) by mass" and "% by mass", respectively. The methods for measuring the various physical property values of the polymer are now shown below.

[Evaluation of Polymer Properties]

Vinyl bond content (%): Measured for the polymer before hydrogenation by $^1$H-NMR at 400 MHz.

Bonded styrene content (%): Measured for the polymer before hydrogenation by $^1$H-NMR at 400 MHz.

First peak weight average molecular weight (Mw) and molecular weight distribution (Mw/Mn): A chart based on molecular weight in terms of polystyrene was obtained by gel permeation chromatography (GPC) for the polymer before hydrogenation, and the chart was used to determine the values. The specific measurement conditions of the GPC are as follows.

(GPC Measurement Conditions)

Measuring instrument: HLC-8020 (manufactured by Tosoh Corporation)

Columns: Two GMH-HR-H (manufactured by Tosoh Corporation) were connected in series.

Detector: Differential refractometer RI-8020 (manufactured by Tosoh Corporation)

Eluent: Tetrahydrofuran

Column temperature: 40° C.

Flow rate: 1.0 ml/min

Sample concentration: 10 mg/20 ml

Hydrogenation ratio (%) and α: Determined by $^1$H-NMR at 400 MHz.

Cold flow (C/F): Cold flow was measured by extruding the polymer through a ¼-inch orifice at a pressure of 3.5 lbs/square inch and a temperature of 70° C. After leaving to stand for 10 minutes to obtain a steady state, the extrusion rate was measured and the values were indicated in grams per minute (mg/min). The smaller the cold flow value, the better the shape stability (storage stability) is. When the cold flow value is less than 1.0, the shape stability is determined to be "good (A)", when the cold flow value is 1.0 or more and less than 2.0, the shape stability is determined to be "fair (B)", and when the cold flow value is 2.0 or more, the shape stability is determined to be "poor (C)".

Equilibrium storage modulus E' (MPa): Using a dynamic viscoelasticity measuring instrument (manufactured by TA Instruments), in the tensile mode, the equilibrium storage modulus E' was measured under the conditions of a measurement temperature of −80° C. to 150° C., a rate of increase in temperature of 5° C./min, a tensile strain of 0.1%, and a frequency of 1 Hz.

Synthesis of Hydrogenated Conjugated Diene-Based Polymer

Example 1: Synthesis of Hydrogenated Conjugated Diene-Based Polymer a and Physical Properties Thereof An autoclave reaction vessel that had been purged with nitrogen and had an internal volume of 50 liters was charged with 25600 g of cyclohexane, 66 g of tetrahydrofuran, 960 g of styrene, and 2176 g of 1,3-butadiene. The temperature of the contents of the reaction vessel was adjusted to 40° C., and then 33 mmol of n-butyllithium was added as a polymerization initiator to initiate polymerization. The polymerization was carried out under adiabatic conditions, and the maximum temperature reached 85° C. When the polymerization conversion reached 99% (20 minutes after the start of polymerization), 64 g of 1,3-butadiene was added over 2 minutes, then 13 mmol of the compound represented by the following formula (N-1) as a terminal reactant was added, and the reaction was carried out for 15 minutes.

Next, the reaction solution was heated to 80° C. or higher and hydrogen was introduced into the system. Then, 2.2 g of [bis(η5-cyclopentadienyl)titanium(furfuryloxy)chloride], 3.6 g of diethyl aluminum chloride, and 0.9 g of n-butyllithium were added as hydrogenation catalysts, and the reaction was carried out so as to maintain the hydrogen pressure at 0.7 MPa or more. After reaching a predetermined integrated hydrogen flow rate, the reaction solution was returned to normal temperature and pressure, and extracted from the reaction vessel to obtain a polymer solution.

Next, 14 g of 2,6-di-tert-butyl-p-cresol was added to the obtained polymer solution, and the polymer solution was added (in a ratio of 200 parts by mass of water to 100 parts by mass of the polymer solution) to a desolvation tank containing water. The solvent of the liquid phase in the desolvation tank was removed by steam stripping (steam temperature: 190° C.) at 95° C. for 1 hour, and a drying operation was carried out with a hot roll adjusted to a temperature of 110° C. to obtain a hydrogenated conjugated diene-based polymer A. The polymerization formulation of the hydrogenated conjugated diene-based polymer A is shown in Table 1 below, and various physical property values of the obtained hydrogenated conjugated diene-based polymer A are shown in Table 2 below.

[F11]

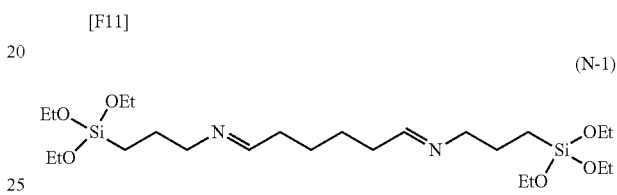

(N-1)

Examples 2 to 6: Synthesis of Hydrogenated Conjugated Diene-Based Polymers B to F and Physical Properties Thereof Hydrogenated conjugated diene-based polymers B to F were obtained by the same method as in Example 1, except that the polymerization formulation was changed as shown in Table 1 below and the hydrogenation ratio was changed as shown in Table 2 below. In Example 5, 26 mmol of piperidine was charged into an autoclave reaction vessel together with cyclohexane, tetrahydrofuran, styrene and 1,3-butadiene. In Example 6, 33 mmol of the compound represented by the following formula (K-2) was charged into an autoclave reaction vessel together with cyclohexane, tetrahydrofuran, styrene, and 1,3-butadiene. The various physical property values and the like of the obtained hydrogenated conjugated diene-based polymers B to F are shown in Table 2 below.

Comparative Example 1: Synthesis of Unhydrogenated Conjugated Diene-Based Polymer P and Physical Properties Thereof An unhydrogenated conjugated diene-based polymer P was obtained by the same method as in Example 1, except that the polymerization formulation was changed as shown in Table 1 below and the hydrogenation treatment was not performed. The various physical property values and the like of the obtained conjugated diene-based polymer P are shown in Table 2 below.

Comparative Examples 2 to 6: Synthesis of Hydrogenated Conjugated Diene-Based Polymers Q to U and Physical Properties Thereof Hydrogenated conjugated diene-based polymers Q to U were obtained by the same method as in Example 1, except that the polymerization formulation was changed as shown in Table 1 below and the hydrogenation ratio was changed as shown in Table 2 below. The various physical property values and the like of the obtained hydrogenated conjugated diene-based polymers Q to U are shown in Table 2 below.

TABLE 1

|  |  | Examples |  |  |  |  |  | Comparative Examples |  |  |  |  |  |
|---|---|---|---|---|---|---|---|---|---|---|---|---|---|
|  |  | 1 | 2 | 3 | 4 | 5 | 6 | 1 | 2 | 3 | 4 | 5 | 6 |
| Type of (hydrogenated) conjugated diene-based polymer |  | A | B | C | D | E | F | P | Q | R | S | T | U |
| Polymerization formulation |  |  |  |  |  |  |  |  |  |  |  |  |  |
| Solvent |  |  |  |  |  |  |  |  |  |  |  |  |  |
| :Cyclohexane | (g) | 25600 | 25600 | 25600 | 25600 | 25600 | 25600 | 25600 | 25600 | 25600 | 25600 | 25600 | 25600 |
| Vinyl-content adjusting agent |  |  |  |  |  |  |  |  |  |  |  |  |  |
| :Tetrahydrofuran | (g) | 66 | 66 | 66 | 66 | 66 | 66 | 66 | 66 | 66 | 66 | 66 | 66 |
| Monomer |  |  |  |  |  |  |  |  |  |  |  |  |  |
| :Styrene | (g) | 960 | 960 | 960 | 960 | 960 | 960 | 960 | 960 | 960 | 960 | 960 | 960 |
| :Butadiene | (g) | 2176 | 2176 | 2176 | 2176 | 2176 | 2176 | 2176 | 2176 | 2176 | 2176 | 2176 | 2176 |
| :Additional butadiene | (g) | 64 | 64 | 64 | 64 | 64 | 64 | 64 | 64 | 64 | 64 | 64 | 64 |
| Polymerization initiator |  |  |  |  |  |  |  |  |  |  |  |  |  |
| :n-butyllithium | (mmol) | 33 | 33 | 33 | 33 | 33 | — | 33 | 33 | 33 | 33 | 33 | 33 |
| :K-1 | (mmol) | — | — | — | — | 26 | — | — | — | — | — | — | — |
| :K-2 | (mmol) | — | — | — | — | — | 33 | — | — | — | — | — | — |
| Terminal reactant |  |  |  |  |  |  |  |  |  |  |  |  |  |
| :N-1 | (mmol) | 13 | 13 | 13 | — | 13 | 13 | 13 | 13 | 13 | — | — | — |
| :N-2 | (mmol) | — | — | — | 13 | — | — | — | — | — | — | — | — |
| :N-3 | (mmol) | — | — | — | — | — | — | — | — | — | 26 | — | — |
| :N-4 | (mmol) | — | — | — | — | — | — | — | — | — | — | 13 | — |
| :N-5 | (mmol) | — | — | — | — | — | — | — | — | — | — | — | 6.5 |

In Table 1, "-" means that the compound of the corresponding column was not used. The abbreviations of the polymerization initiators and the terminal reactants are as follows (the same applies to Table 2 below).

K-1: Piperidine
K-2: Compound represented by formula (K-2)
N-1: Compound represented by the above formula (N-1).
N-2: Compound represented by formula (N-2)
N-3: Compound represented by formula (N-3)
N-4: Compound represented by formula (N-4)
N-5: Tetrachlorosilane

[F12]

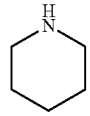

(K-1)

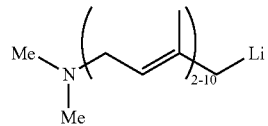

(K-2)

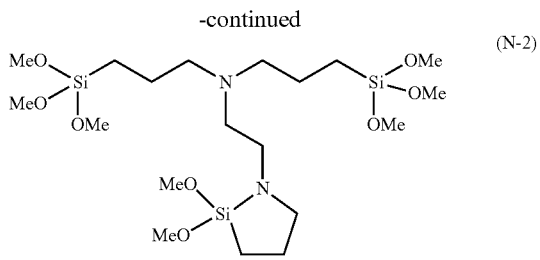

(N-2)

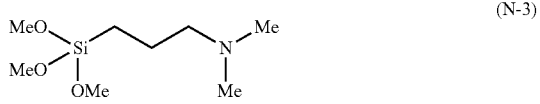

(N-3)

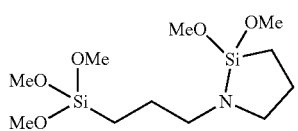

(N-4)

TABLE 2

|  | Examples |  |  |  |  |  | Comparative Examples |  |  |  |  |  |
|---|---|---|---|---|---|---|---|---|---|---|---|---|
| Polymer physical properties | 1 | 2 | 3 | 4 | 5 | 6 | 1 | 2 | 3 | 4 | 5 | 6 |
| Type of polymer | A | B | C | D | E | F | P | Q | R | S | T | U |
| Bonded styrene content (wt %) | 30 | 30 | 30 | 30 | 30 | 30 | 30 | 30 | 30 | 30 | 30 | 30 |
| Vinyl bond content (mol %) | 34 | 34 | 34 | 34 | 34 | 34 | 34 | 34 | 34 | 34 | 34 | 34 |
| Initiation modifier | — | — | — | — | K-1 | K-2 | — | — | — | — | — | — |
| Terminal modifier | N-1 | N-1 | N-1 | N-2 | N-1 | N-1 | N-1 | N-1 | N-1 | N-3 | N-4 | N-5 |

TABLE 2-continued

| | Examples | | | | | | Comparative Examples | | | | | |
|---|---|---|---|---|---|---|---|---|---|---|---|---|
| Polymer physical properties | 1 | 2 | 3 | 4 | 5 | 6 | 1 | 2 | 3 | 4 | 5 | 6 |
| First peak weight average molecular weight ($\times 10^4$) | 13 | 14 | 13 | 14 | 14 | 13 | 14 | 14 | 13 | 21 | 13 | 12 |
| Molecular weight distribution | 1.27 | 1.23 | 1.31 | 1.34 | 1.41 | 1.42 | 1.34 | 1.34 | 1.29 | 1.05 | 1.21 | 1.32 |
| Hydrogenation ratio (%) | 85 | 90 | 95 | 93 | 95 | 94 | 0 | 70 | 98 | 93 | 2 | 93 |
| Cold flow | A | A | A | A | A | A | B | A | A | C | A | A |
| Equilibrium storage modulus E' (mPa) | 2.8 | 3.1 | 3.3 | 3.1 | 3.2 | 3.2 | 1.9 | 2.2 | 3.4 | 3.0 | 3.1 | 3.3 |

<Production of Rubber Composition and Crosslinked Polymer>

Using the (hydrogenated) conjugated diene-based polymers A to F and P to U produced above, each component was blended according to the formulation shown in Table 3 below, and a rubber composition was produced by kneading the components. The kneading was performed by the following method. Using a plastomill (internal capacity: 250 ml) equipped with a temperature control device, a first stage of kneading was carried out by mixing and kneading the hydrogenated or unhydrogenated modified conjugated diene-based polymers (A to F and P to U), silica, a silane coupling agent, extender oil, stearic acid, zinc oxide, and an antioxidant under conditions of a filling ratio of 72% and a rotation speed of 60 rpm. Next, as a second stage of kneading, the formulation obtained above was cooled to room temperature, then a vulcanization accelerator and sulfur were added, and the mixture was kneaded. The obtained rubber composition was molded and vulcanized at 160° C. for a predetermined time with a vulcanization press to obtain a crosslinked rubber (vulcanized rubber). The break strength, wear resistance at a low slip ratio, and rolling resistance (fuel efficiency) were evaluated as follows. The results are shown in Table 4 below.

(1) Break strength: Using the crosslinked polymer as a measurement sample, the tensile strength (TB) at break was measured according to JIS K6251: 2010. The larger the numerical value, the higher (better) the break strength.

(2) Wear resistance: Using the crosslinked polymer as a measurement sample, a Lambourn wear tester (manufactured by Shimada Giken Co., Ltd.) was used to measure the amount of wear at a temperature of 50° C. and a slip ratio of 15% according to JIS K6264-2: 2005. The measurement results are shown as an index with the reciprocal of the amount of wear of Comparative Example 1 as 100. The larger the numerical value, the better the wear resistance.

(3) Rolling resistance (50° C. tan δ): Using the crosslinked rubber as a measurement sample, an ARES-RDA (manufactured by TA Instruments) was used to perform the measurement under conditions of a shear strain of 0.7%, an angular velocity of 100 radians per second, and at 50° C. The measurement results are shown as an index with Comparative Example 1 as 100. The larger the numerical value, the smaller the energy loss and the better the rolling resistance (fuel efficiency).

TABLE 3

| Formulation (phr) | |
|---|---|
| (Hydrogenated) conjugated diene-based polymer | 100 |
| Silica *1) | 75 |
| Silane coupling agent *2) | 6.0 |
| Extender oil *3) | 34 |
| Stearic acid | 2.0 |
| Zinc oxide | 3.0 |
| Antioxidant *4) | 1.0 |
| Vulcanization accelerator CZ *5) | 1.8 |
| Vulcanization accelerator D *6) | 1.5 |
| Sulfur | 1.5 |

*1) ZEOSIL 1165MP, manufactured by Rhodia
*2) Si75, manufactured by Evonik
*3) Process Oil T-DAE, manufactured by ENEOS Corporation
*4) Ozonene 6C, manufactured by Seiko Chemical Co., Ltd.
*5) Nocceler CZ, manufactured by Ouchi Shinko Chemical Industrial Co., Ltd.
*6) Nocceler D, manufactured by Ouchi Shinko Chemical Industrial Co., Ltd.

TABLE 4

| | Examples | | | | | | Comparative Examples | | | | | |
|---|---|---|---|---|---|---|---|---|---|---|---|---|
| Properties | 1 | 2 | 3 | 4 | 5 | 6 | 1 | 2 | 3 | 4 | 5 | 6 |
| Type of polymer | A | B | C | D | E | F | P | Q | R | S | T | U |
| Break strength (MPa) | 30 | 31 | 32 | 31 | 34 | 33 | 17 | 24 | 32 | 29 | 29 | 27 |
| Wear resistance (index) | 147 | 160 | 172 | 161 | 168 | 165 | 100 | 110 | 180 | 150 | 152 | 140 |
| Fuel efficiency (index) | 112 | 105 | 101 | 106 | 110 | 114 | 100 | 110 | 82 | 97 | 99 | 65 |

As can be seen from the results in Table 4, by producing a vulcanized rubber using the rubber compositions of Examples 1 to 6, the break strength and wear resistance were greatly improved compared with the rubber compositions of Comparative Example 1 and Comparative Example 2, in which (hydrogenated) conjugated diene-based polymers having a hydrogenation ratio of 0% and 70% were used. Further, according to the rubber compositions of Examples 1 to 6, excellent break strength and wear resistance were maintained while also greatly improving fuel efficiency compared with the rubber composition of Comparative Example 3, in which a hydrogenated conjugated diene-based polymer having a hydrogenation ratio of 98% was used. Further, compared with the rubber composition of Comparative Example 4, in which the compound (N-3) was used as the terminal reactant, Comparative Example 5, in which the compound (N-4) was used, and Comparative Example 6, in which tetrachlorosilane was used, by using the rubber compositions of Examples 1 to 6, a great improvement was observed in the break strength and fuel efficiency of the vulcanized rubber. From these results, it was confirmed that a vulcanized rubber having high strength and excellent wear resistance could be obtained from the hydrogenated conjugated diene-based polymers A to F. In addition, the vulcanized rubbers obtained by using the hydrogenated conjugated diene-based polymers A to F also exhibited excellent rolling resistance (fuel efficiency).

The invention claimed is:

1. A hydrogenated conjugated diene-based polymer, which has a structure formed by bonding a nitrogen-containing compound having two or more alkoxysilyl groups and two or more nitrogen atoms with a plurality of conjugated diene-based polymer chains, wherein, when a composition ratio (molar ratio) in the hydrogenated conjugated diene-based polymer of each of a structural unit represented by formula (1), a structural unit represented by formula (2), a structural unit represented by formula (3), and a structural unit represented by formula (4) is p, q, r, and s, respectively, a value α represented by formula (i) is 0.80 or more and 0.97 or less, and an equilibrium storage modulus E' of the hydrogenated conjugated diene-based polymer is 2.4 MPa or more, $$\alpha = (p + (0.5 \times r))/(p + q + (0.5 \times r) + s) \quad (i)$$

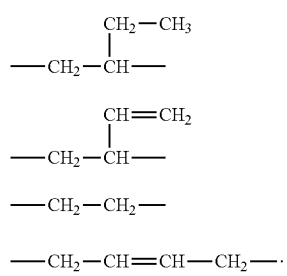

2. The hydrogenated conjugated diene-based polymer of claim 1, wherein the conjugated diene-based polymer chains have a structural unit derived from an aromatic vinyl compound.

3. The hydrogenated conjugated diene-based polymer of claim 1, wherein the conjugated diene-based polymer chains are random copolymer chains of a conjugated diene compound and an aromatic vinyl compound.

4. The hydrogenated conjugated diene-based polymer of claim 1, wherein the nitrogen-containing compound is at least one selected from the group consisting of a compound represented by formula (5) and a compound represented by formula (6),

in which: $R^1$ and $R^2$ are each independently a hydrocarbyl group having 1 to 20 carbon atoms; $R^3$ is an alkanediyl group having 1 to 20 carbon atoms; $A^1$ is a group "*—C($R^5$)=N—" or a group "*—N=C($R^5$)—" (where $R^5$ is a hydrogen atom or hydrocarbyl group, and "*" represents a bond that binds to $R^4$); $R^4$ has an m-valent hydrocarbon group having 1 to 20 carbon atoms, or is an m-valent group having 1 to 20 carbon atoms that has at least one atom selected from the group consisting of a nitrogen atom, an oxygen atom, and a sulfur atom, and in which no active hydrogen is bonded to the at least one atom (where m is an integer of 2 to 10); n is an integer of 1 to 3; and a plurality of $R^1$, $R^2$, $R^3$, $A^1$, and n are the same group or different groups from each other,

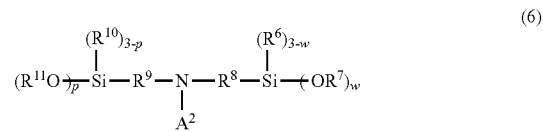

in which: $R^6$, $R^7$, $R^{10}$, and $R^{11}$ are each independently a hydrocarbyl group having 1 to 20 carbon atoms; $R^8$ and $R^9$ are each independently an alkanediyl group having 1 to 20 carbon atoms; $A^2$ is a group represented by formula (7), a group represented by formula (8), a group represented by formula (9), or a group represented by formula (10); w and p are each independently an integer of 1 to 3; and a plurality of $R^6$, $R^7$, $R^{10}$, and $R^{11}$ are the same group or different groups, respectively,

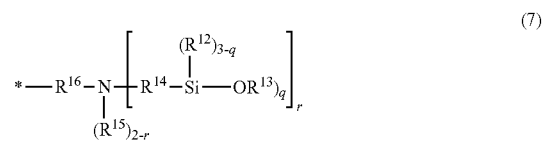

in which: $R^{12}$, $R^{13}$, and $R^{15}$ are each independently a hydrocarbyl group having 1 to 20 carbon atoms; $R^{14}$ and $R^{16}$ are each independently an alkanediyl group having 1 to 20 carbon atoms; q is an integer of 1 to 3; r is an integer of 0 to 2; a plurality of $R^{12}$ to $R^{15}$ and q are the same group or different groups, respectively; and "*" represents a bond that binds to the nitrogen atom in formula (6),

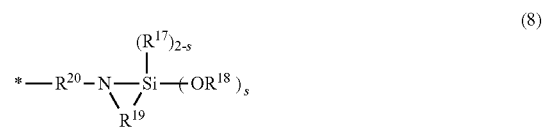

in which: $R^{19}$ is an alkanediyl group having 3 to 20 carbon atoms; $R^{19}$, the nitrogen atom and the silicon atom form a ring structure of 5 or more members; $R^{17}$ and $R^{18}$ are each independently a hydrocarbyl group having 1 to 20 carbon atoms; $R^{20}$ is an alkanediyl group having 1 to 20 carbon atoms; s is 1 or 2; a plurality of $R^{17}$ and $R^{18}$ are the same group or different groups, respectively; and "*" represents a bond that binds to the nitrogen atom in formula (6),

in which: $R^{23}$ is an alkanediyl group having 1 to 20 carbon atoms; $R^{21}$ is a hydrocarbylidene group having 1 to 20 carbon atoms; $R^{22}$ is an alkanediyl group or an alkenediyl group having 1 to 20 carbon atoms; $R^{21}$, $R^{22}$ and the two nitrogen atoms form a ring structure of 5 or more members; and "*" represents a bond that binds to the nitrogen atom in formula (6), and

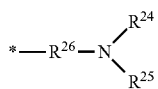

(10)

in which: $R^{26}$ is a hydrocarbylene group having 1 to 20 carbon atoms; $R^{24}$ and $R^{25}$ are each independently a hydrocarbyl group having 1 to 20 carbon atoms, or $R^{24}$ and $R^{25}$ together represent a ring structure of 4 to 20 carbon atoms formed together with the nitrogen atom to which $R^{24}$ and $R^{25}$ are bonded, or $R^{24}$ and $R^{25}$ together represent a ring structure of 5 or more members formed together with the nitrogen atom shown above in formula (10) and a nitrogen atom different from the nitrogen atom shown above in formula (10) or an oxygen atom; and "*" represents a bond that binds to the nitrogen atom in formula (6).

5. The hydrogenated conjugated diene-based polymer of claim 1, which has a molecular weight distribution measured by gel permeation chromatography (GPC) of 1.1 or more and 2.0 or less, and has a peak top molecular weight of a peak having a smallest molecular weight in the hydrogenated conjugated diene-based polymer in a range of $1.0 \times 10^5$ to $2.0 \times 10^6$.

6. The hydrogenated conjugated diene-based polymer of claim 1, wherein the value α is 0.88 or more and 0.97 or less.

7. A polymer composition, comprising the hydrogenated conjugated diene-based polymer of claim 1 and an inorganic filler.

8. A crosslinked body, obtained by a process comprising crosslinking the polymer composition of claim 7.

9. A tire, wherein one or both of a tread and a sidewall are formed using the polymer composition of claim 7.

10. The hydrogenated conjugated diene-based polymer of claim 2, wherein the conjugated diene-based polymer chains are random copolymer chains of a conjugated diene compound and an aromatic vinyl compound.

11. The hydrogenated conjugated diene-based polymer of claim 2, wherein the nitrogen-containing compound is at least one selected from the group consisting of a compound represented by formula (5) and a compound represented by formula (6),

(5)

in which: $R^1$ and $R^2$ are each independently a hydrocarbyl group having 1 to 20 carbon atoms; $R^3$ is an alkanediyl group having 1 to 20 carbon atoms; $A^1$ is a group "*—C($R^5$)=N—" or a group "*—N=C($R^5$)—" (where $R^5$ is a hydrogen atom or hydrocarbyl group, and "*" represents a bond that binds to $R^4$); $R^4$ has an m-valent hydrocarbon group having 1 to 20 carbon atoms, or is an m-valent group having 1 to 20 carbon atoms that has at least one atom selected from the group consisting of a nitrogen atom, an oxygen atom, and a sulfur atom, and in which no active hydrogen is bonded to the at least one atom (where m is an integer of 2 to 10); n is an integer of 1 to 3; and a plurality of $R^1$, $R^2$, $R^3$, $A^1$, and n are the same group or different groups from each other,

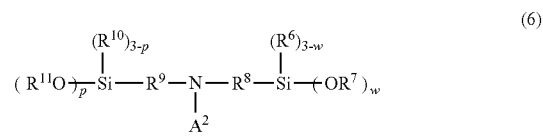

(6)

in which: $R^6$, $R^7$, $R^{10}$, and $R^{11}$ are each independently a hydrocarbyl group having 1 to 20 carbon atoms; $R^8$ and $R^9$ are each independently an alkanediyl group having 1 to 20 carbon atoms; $A^2$ is a group represented by formula (7), a group represented by formula (8), a group represented by formula (9), or a group represented by formula (10); w and p are each independently an integer of 1 to 3; and a plurality of $R^6$, $R^7$, $R^{10}$, and $R^{11}$ are the same group or different groups, respectively,

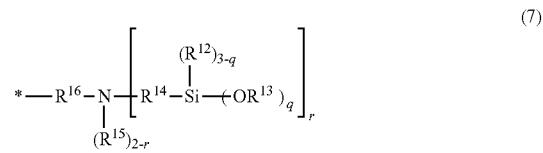

(7)

in which: $R^{12}$, $R^{13}$, and $R^{15}$ are each independently a hydrocarbyl group having 1 to 20 carbon atoms; $R^{14}$ and $R^{16}$ are each independently an alkanediyl group having 1 to 20 carbon atoms; q is an integer of 1 to 3; r is an integer of 0 to 2; a plurality of $R^{12}$ to $R^{15}$ and q are the same group or different groups, respectively; and "*" represents a bond that binds to the nitrogen atom in formula (6),

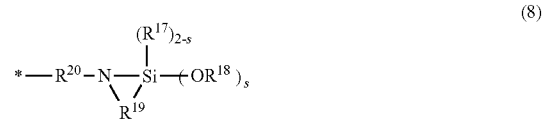

(8)

in which: $R^{19}$ is an alkanediyl group having 3 to 20 carbon atoms; $R^{19}$, the nitrogen atom and the silicon atom form a ring structure of 5 or more members; $R^{17}$ and $R^{18}$ are each independently a hydrocarbyl group having 1 to 20 carbon atoms; $R^{20}$ is an alkanediyl group having 1 to 20 carbon atoms; s is 1 or 2; a plurality of $R^{17}$ and $R^{18}$ are the same group or different groups, respectively; and "*" represents a bond that binds to the nitrogen atom in formula (6),

(9)

in which: $R^{23}$ is an alkanediyl group having 1 to 20 carbon atoms; $R^{21}$ is a hydrocarbylidene group having 1 to 20 carbon atoms; $R^{22}$ is an alkanediyl group or an alkenediyl group having 1 to 20 carbon atoms; $R^{21}$, $R^{22}$ and the two nitrogen atoms form a ring structure of 5 or more members; and "*" represents a bond that binds to the nitrogen atom in formula (6), and

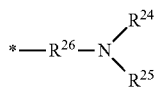
(10)

in which: $R^{26}$ is a hydrocarbylene group having 1 to 20 carbon atoms; $R^{24}$ and $R^{25}$ are each independently a hydrocarbyl group having 1 to 20 carbon atoms, or $R^{24}$ and $R^{25}$ together represent a ring structure of 4 to 20 carbon atoms formed together with the nitrogen atom to which $R^{24}$ and $R^{25}$ are bonded, or $R^{24}$ and $R^{25}$ together represent a ring structure of 5 or more members formed together with the nitrogen atom shown above in formula (10) and a nitrogen atom different from the nitrogen atom shown above in formula (10) or an oxygen atom; and "*" represents a bond that binds to the nitrogen atom in formula (6).

12. The hydrogenated conjugated diene-based polymer of claim 3, wherein the nitrogen-containing compound is at least one selected from the group consisting of a compound represented by formula (5) and a compound represented by formula (6),

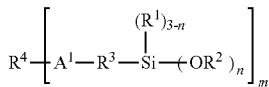
(5)

in which: $R^1$ and $R^2$ are each independently a hydrocarbyl group having 1 to 20 carbon atoms; $R^3$ is an alkanediyl group having 1 to 20 carbon atoms; $A^1$ is a group "*—C($R^5$)=N—" or a group "*—N=C($R^5$)—" (where $R^5$ is a hydrogen atom or hydrocarbyl group, and "*" represents a bond that binds to $R^4$); $R^4$ has an m-valent hydrocarbon group having 1 to 20 carbon atoms, or is an m-valent group having 1 to 20 carbon atoms that has at least one atom selected from the group consisting of a nitrogen atom, an oxygen atom, and a sulfur atom, and in which no active hydrogen is bonded to the at least one atom (where m is an integer of 2 to 10); n is an integer of 1 to 3; and a plurality of $R^1$, $R^2$, $R^3$, $A^1$, and n are the same group or different groups from each other,

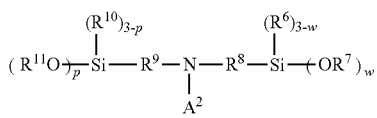
(6)

in which: $R^6$, $R^7$, $R^{10}$, and $R^{11}$ are each independently a hydrocarbyl group having 1 to 20 carbon atoms; $R^8$ and $R^9$ are each independently an alkanediyl group having 1 to 20 carbon atoms; $A^2$ is a group represented by formula (7), a group represented by formula (8), a group represented by formula (9), or a group represented by formula (10); w and p are each independently an integer of 1 to 3; and a plurality of $R^6$, $R^7$, $R^{10}$, and $R^{11}$ are the same group or different groups, respectively,

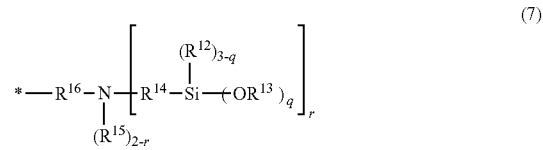
(7)

in which: $R^{12}$, $R^{13}$, and $R^{15}$ are each independently a hydrocarbyl group having 1 to 20 carbon atoms; $R^{14}$ and $R^{16}$ are each independently an alkanediyl group having 1 to 20 carbon atoms; q is an integer of 1 to 3; r is an integer of 0 to 2; a plurality of $R^{12}$ to $R^{15}$ and q are the same group or different groups, respectively; and "*" represents a bond that binds to the nitrogen atom in formula (6),

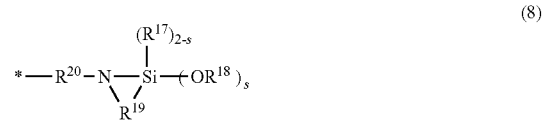
(8)

in which: $R^{19}$ is an alkanediyl group having 3 to 20 carbon atoms; $R^{19}$, the nitrogen atom and the silicon atom form a ring structure of 5 or more members; $R^{17}$ and $R^{18}$ are each independently a hydrocarbyl group having 1 to 20 carbon atoms; $R^{20}$ is an alkanediyl group having 1 to 20 carbon atoms; s is 1 or 2; a plurality of $R^{17}$ and $R^{18}$ are the same group or different groups, respectively; and "*" represents a bond that binds to the nitrogen atom in formula (6),

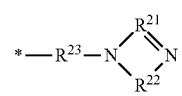
(9)

in which: $R^{23}$ is an alkanediyl group having 1 to 20 carbon atoms; $R^{21}$ is a hydrocarbylidene group having 1 to 20 carbon atoms; $R^{22}$ is an alkanediyl group or an alkenediyl group having 1 to 20 carbon atoms; $R^{21}$, $R^{22}$ and the two nitrogen atoms form a ring structure of 5 or more members; and "*" represents a bond that binds to the nitrogen atom in formula (6), and

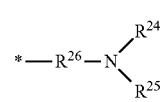
(10)

in which: $R^{26}$ is a hydrocarbylene group having 1 to 20 carbon atoms; $R^{24}$ and $R^{25}$ are each independently a hydrocarbyl group having 1 to 20 carbon atoms, or $R^{24}$ and $R^{25}$ together represent a ring structure of 4 to 20 carbon atoms formed together with the nitrogen atom to which $R^{24}$ and $R^{25}$ are bonded, or $R^{24}$ and $R^{25}$ together represent a ring structure of 5 or more members formed together with the nitrogen atom shown above in formula (10) and a nitrogen atom different from the nitrogen atom shown above in formula (10) or an oxygen atom; and "*" represents a bond that binds to the nitrogen atom in formula (6).

13. The hydrogenated conjugated diene-based polymer of claim 2, which has a molecular weight distribution measured by gel permeation chromatography (GPC) of 1.1 or more and 2.0 or less, and has a peak top molecular weight of a peak having a smallest molecular weight in the hydrogenated conjugated diene-based polymer in a range of $1.0 \times 10^5$ to $2.0 \times 10^6$.

14. The hydrogenated conjugated diene-based polymer of claim 3, which has a molecular weight distribution measured by gel permeation chromatography (GPC) of 1.1 or more and 2.0 or less, and has a peak top molecular weight of a peak having a smallest molecular weight in the hydrogenated conjugated diene-based polymer in a range of $1.0 \times 10^5$ to $2.0 \times 10^6$.

15. The hydrogenated conjugated diene-based polymer of claim 4, which has a molecular weight distribution measured by gel permeation chromatography (GPC) of 1.1 or more and 2.0 or less, and has a peak top molecular weight of a peak having a smallest molecular weight in the hydrogenated conjugated diene-based polymer in a range of $1.0 \times 10^5$ to $2.0 \times 10^6$.

16. The hydrogenated conjugated diene-based polymer of claim 2, wherein the value $\alpha$ is 0.88 or more and 0.97 or less.

17. The hydrogenated conjugated diene-based polymer of claim 3, wherein the value $\alpha$ is 0.88 or more and 0.97 or less.

18. The hydrogenated conjugated diene-based polymer of claim 4, wherein the value $\alpha$ is 0.88 or more and 0.97 or less.

19. The hydrogenated conjugated diene-based polymer of claim 5, wherein the value $\alpha$ is 0.88 or more and 0.97 or less.

20. A polymer composition, comprising the hydrogenated conjugated diene-based polymer of claim 2 and an inorganic filler.

* * * * *